US010459524B2

(12) United States Patent
Clark

(10) Patent No.: US 10,459,524 B2
(45) Date of Patent: Oct. 29, 2019

(54) MULTI-SENSOR CONTROL SYSTEM AND METHOD FOR REMOTE SIGNALING CONTROL OF UNMANNED VEHICLES

(71) Applicant: Ryan T. Clark, Escondido, CA (US)

(72) Inventor: Ryan T. Clark, Escondido, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 555 days.

(21) Appl. No.: 14/686,370

(22) Filed: Apr. 14, 2015

(65) Prior Publication Data

US 2017/0031446 A1 Feb. 2, 2017

(51) Int. Cl.
| | |
|---|---|
| *G06F 3/01* | (2006.01) |
| *G06F 3/0346* | (2013.01) |
| *G05D 1/00* | (2006.01) |
| *A63H 27/00* | (2006.01) |
| *H04W 4/80* | (2018.01) |
| *B64C 39/02* | (2006.01) |

(52) U.S. Cl.
CPC ............ *G06F 3/017* (2013.01); *A63H 27/12* (2013.01); *B64C 39/024* (2013.01); *G05D 1/0016* (2013.01); *G05D 1/0022* (2013.01); *G06F 3/014* (2013.01); *G06F 3/0346* (2013.01); *B64C 2201/14* (2013.01); *B64C 2201/146* (2013.01); *H04W 4/80* (2018.02)

(58) Field of Classification Search
CPC ........ G06F 3/017; G06F 3/0346; G06F 3/014; G05D 1/0022; G05D 1/0016; A63H 27/12; H04W 4/008; B64C 2201/146
See application file for complete search history.

(56) References Cited

U.S. PATENT DOCUMENTS

| 8,005,257 B2 | 8/2011 | Venetsky et al. |
| 8,194,925 B2 | 6/2012 | Higgins |
| 8,460,103 B2 | 6/2013 | Mattice et al. |
| (Continued) | | |

FOREIGN PATENT DOCUMENTS

| JP | 5-149706 A | 12/2009 |
| JP | 2012509812 | 4/2012 |
| WO | 2014/130871 A1 | 8/2014 |
| WO | 2015/014116 A1 | 2/2015 |

OTHER PUBLICATIONS

International Search Report for corresponding PCT/US2016/027857; dated Jun. 24, 2016.

(Continued)

*Primary Examiner* — Aneeta Yodichkas
(74) *Attorney, Agent, or Firm* — Tarolli, Sundheim, Covell & Tummino LLP

(57) ABSTRACT

An apparatus includes a wearable device having a multi-sensor detector to sense operator gestures directed at an unmanned vehicle (UV). The multi-sensor detector includes at least two sensors to detect motion and direction of the operator gestures with respect to operator hand movement, operator hand movement with respect to the earth, rotational movement of the operator hand, and finger movement on the operator hand. A controller monitors the multi-sensor detector to determine the operator gesture based on input data received from the sensors. The controller generates a command to the UV based on the determined operator gesture.

20 Claims, 7 Drawing Sheets

(56) References Cited

U.S. PATENT DOCUMENTS

| | | | | |
|---|---|---|---|---|
| 2007/0198144 | A1* | 8/2007 | Norris | H04L 67/12 701/23 |
| 2011/0288696 | A1 | 11/2011 | Lefebure | |
| 2012/0287284 | A1* | 11/2012 | Jacobsen | G06F 1/163 348/158 |
| 2014/0024999 | A1* | 1/2014 | Levien | G05D 1/00 604/66 |
| 2014/0104156 | A1* | 4/2014 | Touma | G06F 3/014 345/156 |
| 2014/0316614 | A1 | 10/2014 | Newman | |
| 2015/0032293 | A1* | 1/2015 | O'Neill | B25J 13/006 701/2 |
| 2015/0169074 | A1* | 6/2015 | Ataee | G06F 3/017 345/156 |
| 2016/0054837 | A1* | 2/2016 | Stafford | A63F 13/825 463/33 |
| 2016/0241767 | A1* | 8/2016 | Cho | H04N 5/23203 |
| 2017/0207519 | A1* | 7/2017 | Tzanidis | H01Q 1/38 |

OTHER PUBLICATIONS

Wang, et al.: "*Shader-Based Sensor Simulation for Autonomous Car Testing*"; Intelligent Transportation Systems (ITSC), 2012 15$^{th}$ International IEEE Conference on, IEEE, Sep. 16, 2012, pp. 224-229, XP032264235, DOI: 10.1109/ITSC.212.6338904, ISBN: 978-1-46733064-0; entire document.

Yang, et al.: "*Autonomous Overtaking Motion Simulation for Autonomous Virtual Vehicle Based on Eon Studio*"; Computer Science and Information Technology, 2008, ICCSIT '08, International Conference on, IEEE, Piscataway, NJ, USA, Aug. 29, 2008, pp. 870-874, XP031320915, ISBN: 978-0-7695-3308-7; entire document.

Japanese Office Action dated Oct. 11, 2018 for corresponding JP 2017-553990; Action & translation enclosed herein.

Japanese Office Action Corresponding to Japanese Patent Application No. 2017-553990, pp. 1-4, dated Jun. 7, 2019.

U.S. Office Action corresponding to U.S. Appl. No. 16/111,487, pp. 1-6, dated Jul. 8, 2019.

* cited by examiner

MULTI-SENSOR CONTROL SYSTEM AND METHOD FOR REMOTE SIGNALING CONTROL OF UNMANNED VEHICLES

TECHNICAL FIELD

This disclosure relates to control systems, and more particularly to a system and method for remote signaling control of unmanned vehicles utilizing a multi-sensor apparatus.

BACKGROUND

Most unmanned systems, regardless of manufacturer who produced the system, require specialized training to operators that require commanders to budget and plan for specialized personnel within an organizational unit. This is impractical in many situations where the specialized training requires months or even years of training prior to proper employment of the unmanned system. For example, an infantry unit cannot be expected to have instrument-rated pilots in order to direct complex air assets within a given battle space. The US military has a long history of interaction between complex systems and minimally-trained personnel where ground war fighters are expected to coordinate and direct ground and air vehicles that are operated by humans. Typically, unmanned systems are developed to be focused on unmanned vehicles and sensors, with the user interface being engineered to saturate the operator with data. This ultimately creates specialized operators with lengthy (and expensive) training requirements, however. Moreover, crude single-sensor sensing systems for detecting operator movements after the specialized training has been implemented often require calibration procedures before they can be deployed and can be slow to detect changes in desired operator commands. Delays for calibration and/or for detecting operator commands can be fatal in a battlefield situation.

SUMMARY

This disclosure relates to a system and method for remote signaling control of unmanned vehicles utilizing a multi-sensor apparatus. In one aspect, an apparatus includes a wearable device having a multi-sensor detector to sense operator gestures directed at an unmanned vehicle (UV). The multi-sensor detector includes at least two sensors to detect motion and direction of the operator gestures with respect to operator hand movement, operator hand movement with respect to the earth, rotational movement of the operator hand, and finger movement on the operator hand. A controller monitors the multi-sensor detector to determine the operator gesture based on input data received from the sensors. The controller generates a command to the UV based on the determined operator gesture.

In another aspect, a system includes a wearable device having a multi-sensor detector to sense operator gestures directed at an unmanned vehicle (UV). The multi-sensor detector includes at least two sensors that include an accelerometer to detect motion and direction of the operator gestures with respect to operator hand movement, a magnetometer to detect operator hand movement with respect to the earth, a gyroscope to detect rotational movement of the operator hand, and a resistance strip to detect finger movement on the operator hand. A controller monitors the multi-sensor detector to determine the operator gesture based on input data received from the sensors. The controller generates a command based on the determined operator gesture. A communications module relays the command from the controller to control the UV.

In yet another aspect, a method includes sensing operator gestures directed at an unmanned vehicle from a wearable device having at least two sensors. The method includes analyzing the sensors to detect motion and direction of the operator gestures with respect to operator hand movement, operator hand movement with respect to the earth, rotational movement of the operator hand, and finger movement on the operator hand. The method includes determining the operator gestures based on the analyzing of the sensors. The method includes communicating a command to control operations of the UV.

DETAILED DESCRIPTION

This disclosure relates to a system and method for remote signaling control of unmanned vehicles (UV) utilizing a multi-sensor apparatus. This includes controlling the UV via standardized human gestures (e.g., approved hand and arm signals). The system includes a set of wearable devices (e.g., gloves) that a user wears while reenacting a given human gesture (e.g., motion up or down via the hands) to control the UV. Each wearable device includes a multi-sensor detector that can include an accelerometer, a gyroscope, a magnetometer, or a resistance strip, for example, configured to provide sensing of the given human gesture. In an alternative example, the system includes a single glove rather than a set of gloves to control the movement of the UV. By utilizing the multi-sensor detector, complex calibration procedures that are required of single-detector systems can be mitigated. Moreover. Multi-sensor detector allows hand gestures to be more rapidly determined than a conventional single sensor system (e.g., accelerometer detection only).

The wearable device can include a controller to monitor the multi-sensor detector and communicate via a transmission medium (wired or un-wired) through which the measurements are transmitted. The system can further include a communications module such as an electronic device (e.g., a single board computer such as a mobile handheld device) for receiving the measurements/commands from the wearable device. The controller interprets the gesture data to extract characteristics that correspond to the given hand gesture (e.g., left/right, up/down, hand rotation, finger movement, and so forth). The extracted characteristics are employed by the controller to generate a command signal (or signals) to the UV based on known hand gesture characteristics to control the UV. In another aspect, the system further includes a head mounted display (HMD) that can be worn on or about the head of the user. The HMD is configured to communicate with the communications module and receive relevant information corresponding to the UV (e.g., overall system status, latitude and longitude information of the UV, and so forth).

Figure 1:
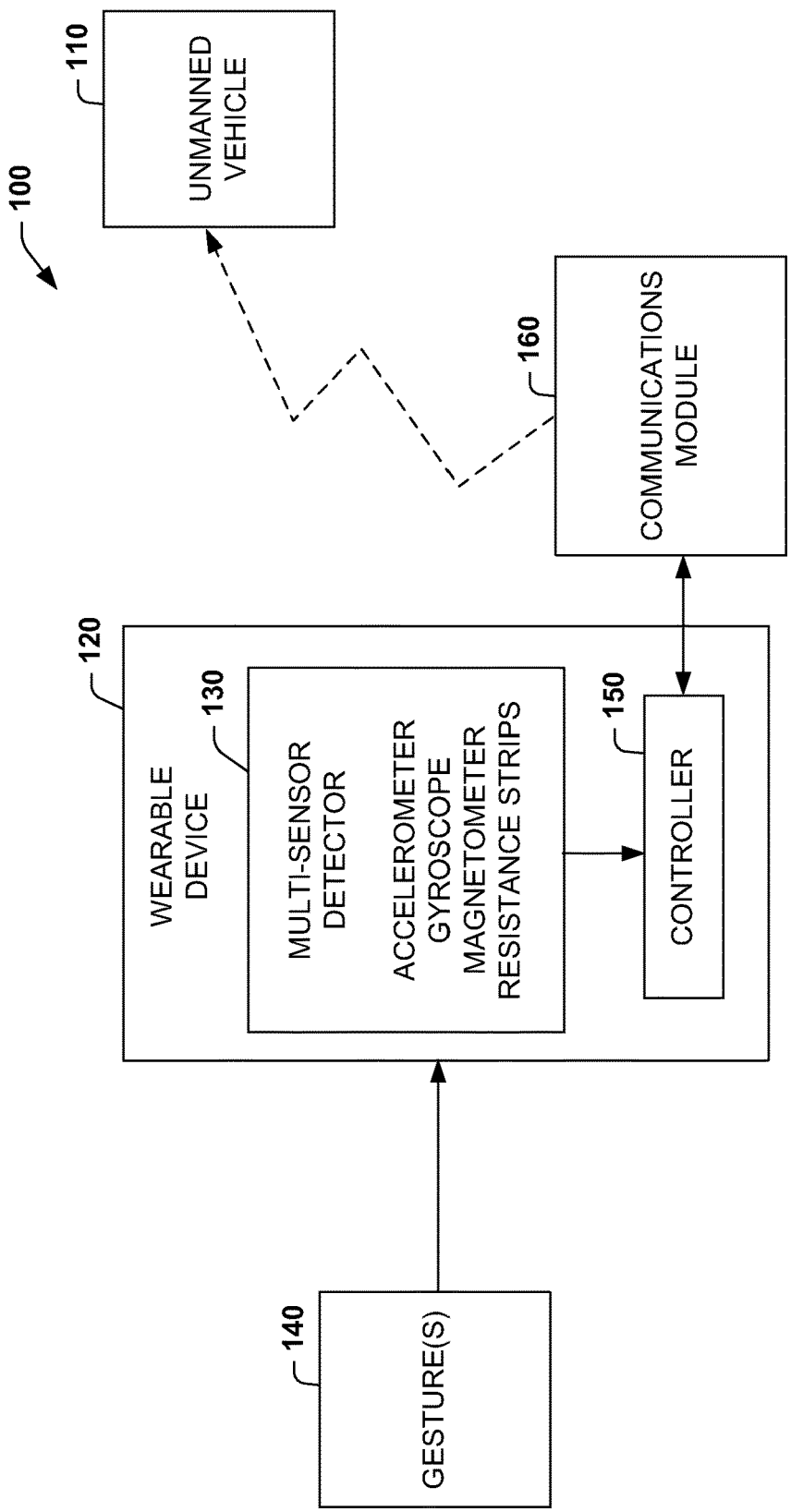
FIG. 1 illustrates an example of a system for remote signaling and control of an unmanned vehicle via a wearable device having a multi-sensor detector to sense operator gestures.

FIG. 1 illustrates an example of a system 100 for remote signaling and control of an unmanned vehicle 110 via a wearable device 120 having a multi-sensor detector to sense operator gestures 140. The multi-sensor detector 130 of the wearable device 130 (e.g., wearable glove) senses operator gestures directed at the UV 110. The multi-sensor detector 130 includes at least two sensors to detect motion and direction of the operator gestures with respect to operator hand movement, operator hand movement with respect to the earth, rotational movement of the operator hand, and finger movement on the operator hand. For example, the sensors can include an accelerometer to detect motion and direction of the operator gestures with respect to operator hand movement (e.g., left or right horizontal hand motions across the body). The sensors can also include a magnetometer to detect operator hand movement with respect to the earth's magnetic field (e.g., hand movement in a lateral direction). In another example, the sensors can include a gyroscope to detect rotational movement of the operator hand. The sensors can also include finger mounted resistance strip to detect finger movement on the operator hand (e.g., when finger flexes, resistance strip flexes changing its resistance). The gestures 140 can be interpreted from any standard military or industrial manual. Example manuals include Air Force instruction manual 11-218, Department of Army Visual Signals manual FM-2160, and Naval Air manual NAVAIR 00-80T-113, for example A controller 150 monitors the multi-sensor detector 130 to determine the operator gesture based on input data received from the sensors (e.g., from at least two sensors). The controller 150 generates a command to/for (e.g., directly or indirectly) the UV 110 based on the determined operator gesture. For example, if the controller 150 senses that the operator has moved both hands down toward the ground via the detector 130, the controller can issue a down command that is subsequently utilized by the unmanned vehicle to control its flight path in a downward direction. As shown in this example, the controller 150 can send the command to a communications module 160 which relays the command to control the UV. In some example implementations, the controller 150 and/or communications module 160 can be provided as part of the wearable device 120. In other examples, the controller 150 and/or communications module can be external to the glove and wired thereto for respective communications to the multi-sensor detector 130. In one specific example, the communications module 160 can be a single board computer (e.g., mobile handheld device) which relays the command from the controller 150 to control the UV 110. Although not shown, the UV includes a separate flight controller that responds to commands generated by the controller 150.

Figure 2:
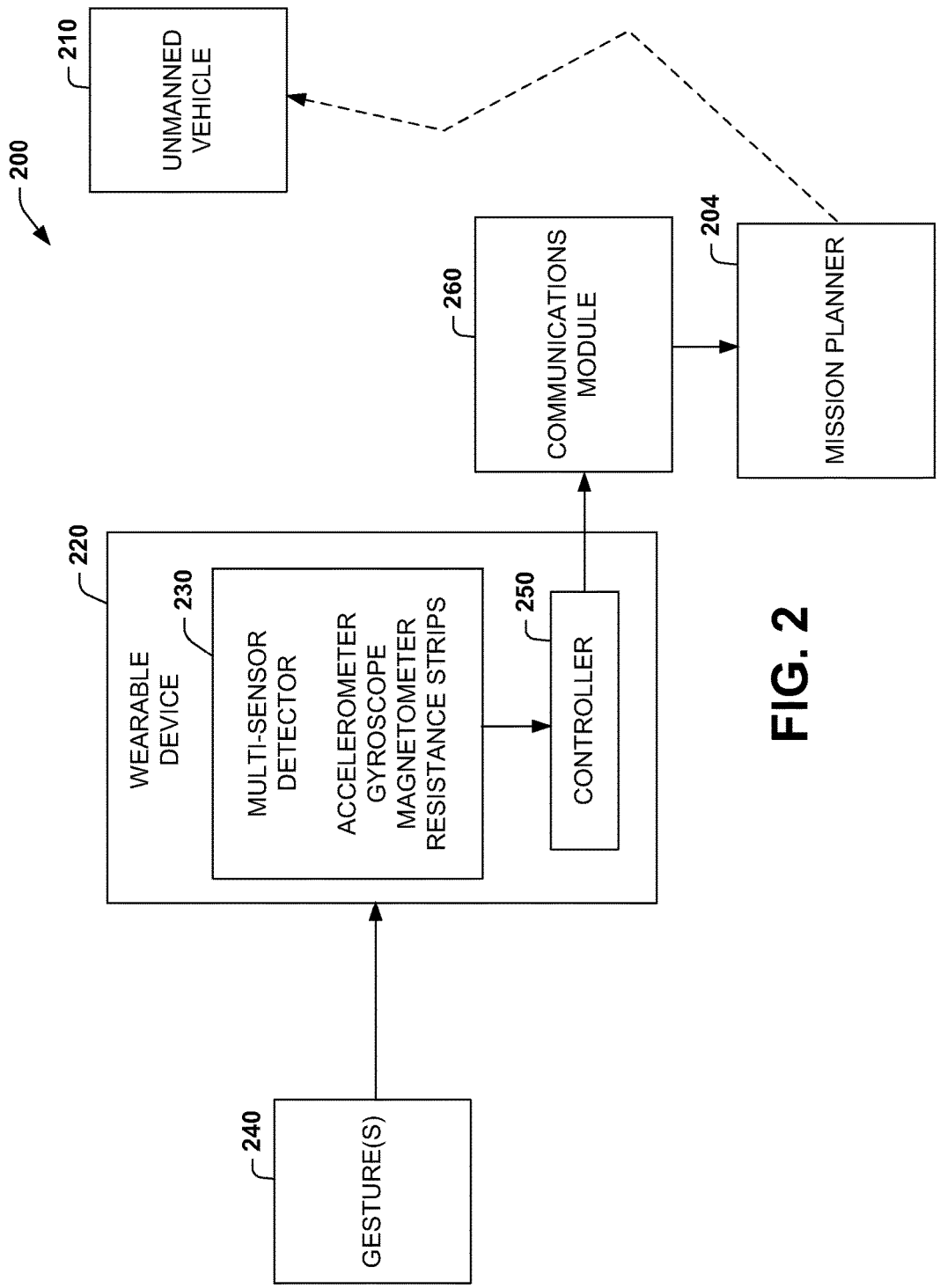
FIG. 2 illustrates an example of a system having a mission planner for remote signaling and control of an unmanned vehicle via a wearable device having a multi-sensor detector to sense operator gestures.
Figure 3:
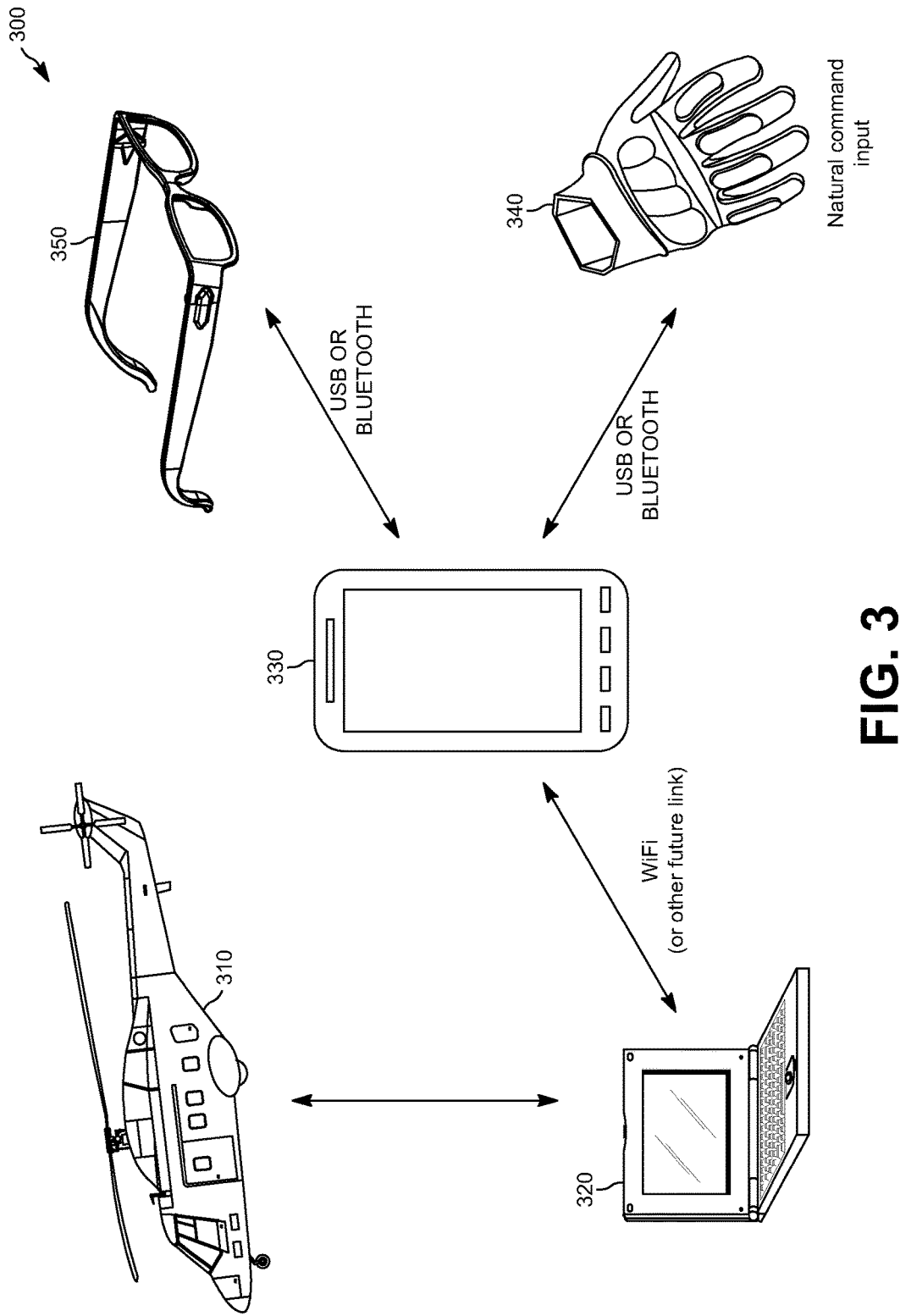
FIG. 3 illustrates an example of system components for remote signaling and control of an unmanned vehicle via a wearable device having a multi-sensor detector to sense operator gestures.

As will be shown and described in more detail with respect to FIG. 3, the controller 150 can send the command via a Bluetooth or a universal serial bus connection (USB) to the communications module 160 which relays the command to control the UV 110. Additionally, a mission planner application can be provided (See e.g., FIG. 2) that communicates with the communications module 160. The mission planner application receives the command from the communications module and generates a control command to control the UV 110 based on the command. The mission planner application can operate on a computer (e.g., laptop) and communicate via a wireless link to the communications module 160. Wearable glasses (See e.g., FIG. 3) can also be provided to communicate mission status from the mission planner application to an operator of the wearable device.

FIG. 2 illustrates an example of a system 200 having a mission planner 204 for remote signaling and control of an unmanned vehicle 210 via a wearable device 220 having a multi-sensor detector 230 to sense operator gestures 240. The multi-sensor detector 230 senses operator gestures 240 directed at the unmanned vehicle 210 (UV). The multi-sensor detector 230 includes at least two sensors that include an accelerometer to detect motion and direction of the operator gestures with respect to operator hand movement, a magnetometer to detect operator hand movement with respect to the earth, a gyroscope to detect rotational movement of the operator hand, and/or a resistance strip to detect finger movement on the operator hand. A controller 250 monitors the multi-sensor detector 230 to determine the operator gesture 240 based on input data received from the sensors, where the controller generates a command for the UV 210 based on the determined operator gesture. A communications module 260 relays the command from the controller to control the UV. In this example, rather than relaying the command directly as shown in the example of FIG. 1, the communications module relays the command to the mission planner 204 which is in contact with the UV 210.

Similar to the examples described above, the communications module 260 can be a single board computer such as a mobile handheld device (or other electronic communication device such as a walkie/talkie) which relays the command to control the UV 210. The controller 250 can send the command via a Bluetooth or a universal serial bus connection (USB), for example, to the communications module 260 which relays the command to control the UV 210. The mission planner 204 can be an application that communicates with the communications module 260, where the mission planner application receives the command from the communications module 260 and generates a control command to control the UV 210 based on the received command. The mission planner application can operate on a computer and communicates via a wireless link to the communications module. Wearable glasses (See e.g., FIG. 3) can be provided to communicate mission status from the mission planner 204 to an operator of the wearable device 230. The mission planner 204 can communicate a software packet via a scripting interface to a generic protocol interface that translates commands in the generic protocol to an application that communicates with the communications module 260. For example, the generic protocol can be a transport control protocol (TCP) and the software packet is communicated via a Python script although other transport and script styles are possible.

FIG. 3 illustrates an example of system components 300 for remote signaling and control of an unmanned vehicle (UV) via a wearable device having a multi-sensor detector to sense operator gestures. In this example, a UV 310 is in wireless communications with a computer 320 operating a mission planner application. The mission planner is in communications with a communications module 330 (e.g., mobile handheld device) which receives gesture commands (via USB or Bluetooth) from wearable device 340. A wearable status display 350 (e.g., Google glass) can be provided to provide status to the operator of the wearable device 340 via the mission planner 320 and/or the communications module 330. This can include communications via a Bluetooth connection for example.

Figure 4:
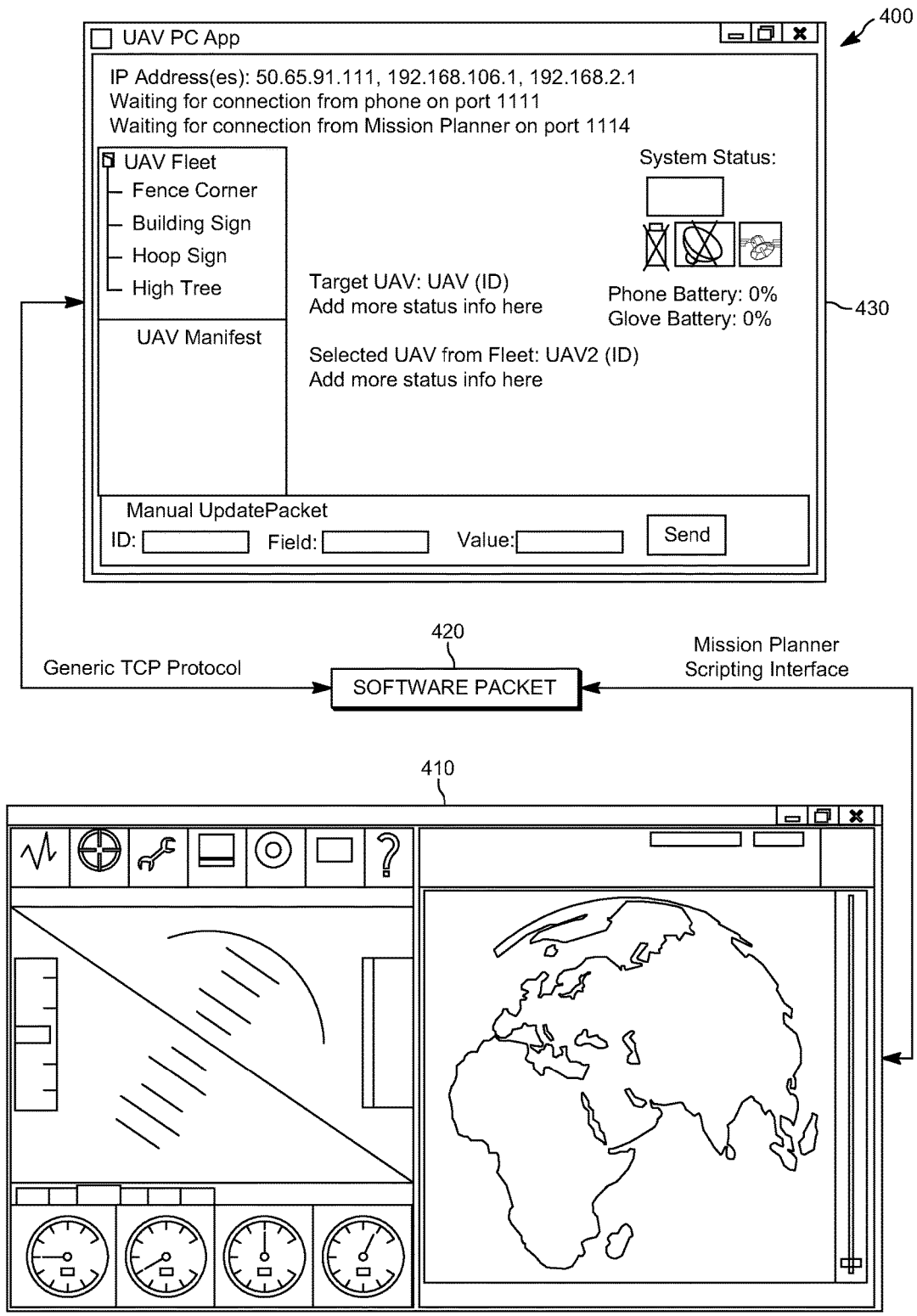
FIG. 4 illustrates an example interface protocol for remote signaling and control of an unmanned vehicle.

FIG. 4 illustrates an example interface protocol for remote signaling and control of an unmanned vehicle. In this example, the mission planner described above with respect to FIG. 3 can operate mission planner software 410 to control various aspects of UV missions such as flight time, destination, navigation, target identity, coordination with other battlefield assets, and so forth. The mission planner software 410 can operate a scripting interface that sends or receives a software packet 420 (e.g., Python script) via a communications module interface 430 that operates via a generic protocol (e.g., TCP protocol). The communications model interface 430 can be associated with a computer, a device such as a single board computer, or wearable glasses, for example to provide status to the operator using the wearable device. The interface 430 can provide status of the wearable devices (e.g., on/off), communications status of the respective modules (e.g., available on not available for communications, wireless status), system status of devices communicating with the mission planner, and status related to the UAV, for example.

Figure 5:
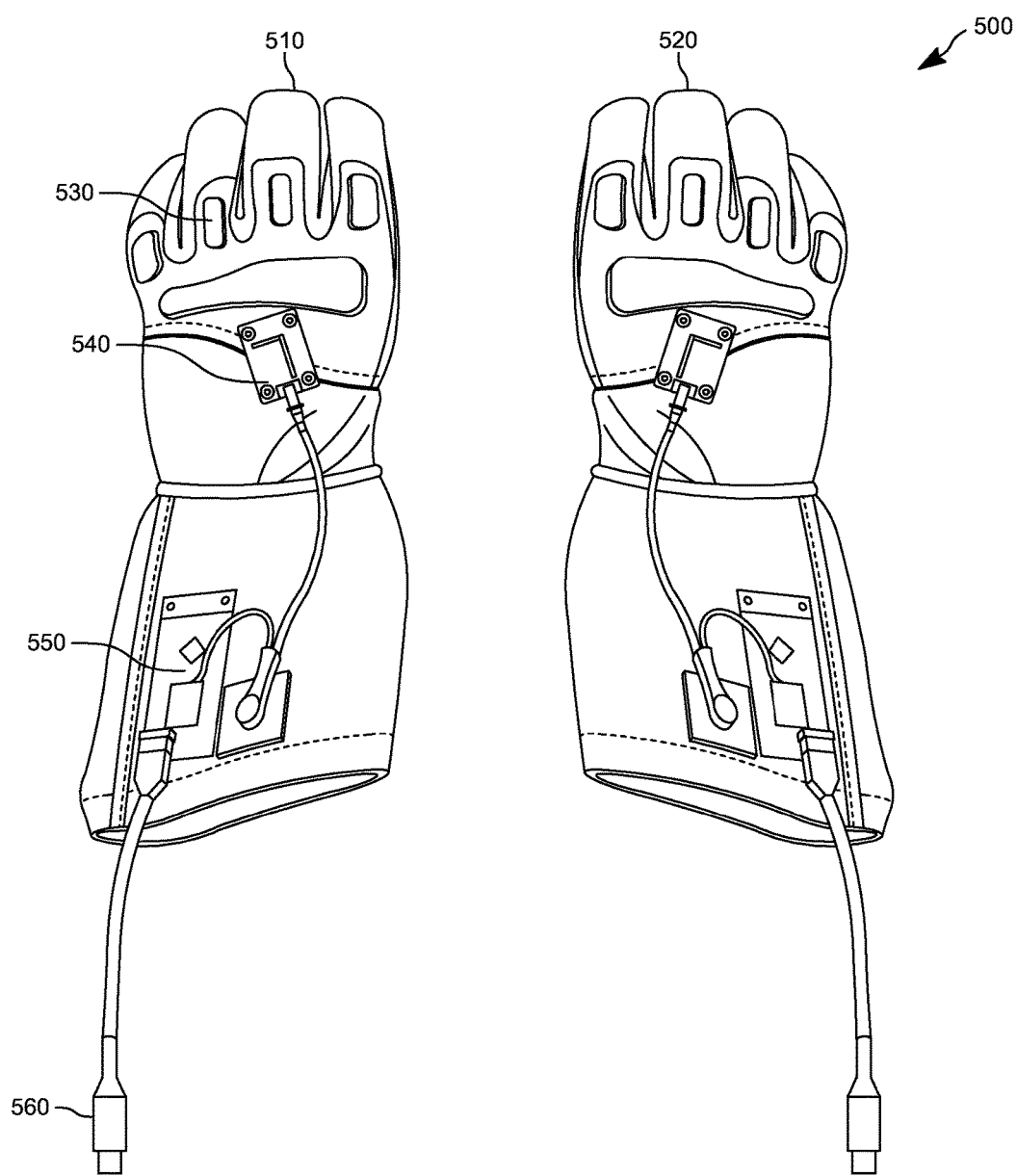
FIG. 5 illustrates an example apparatus for remote signaling and control of an unmanned vehicle via a wearable device having a multi-sensor detector to sense operator gestures.

FIG. 5 illustrates an example apparatus 500 for remote signaling and control of an unmanned vehicle via a wearable device having a multi-sensor detector to sense operator gestures. The wearable device described above with respect to FIG. 1 can be implemented as one or two wearable gloves shown at 510 and 520. The gloves 510 and 520 provide commands based on interpreted operator gestures as described herein. Each of the gloves 510 and 520 can be configured with similar detection sensors and/or controllers as described herein. For instance, the glove 510 includes a resistance strip 530 (or strips) for detecting operator finger movement. A hand sensor 540 can include the accelerometer(s), gyroscopes(s), and/or magnetometers as described with respect to the multi-sensor detector as described herein. One example sensor is a 9 axis sensor such as an inertial measurement unit (IMU). Output from the sensors and/or strips 530 can be communicated to a controller 550 which can send interpreted commands via USB cable 560 which can communicate with a communications module (not shown) as described herein.

Figure 6:
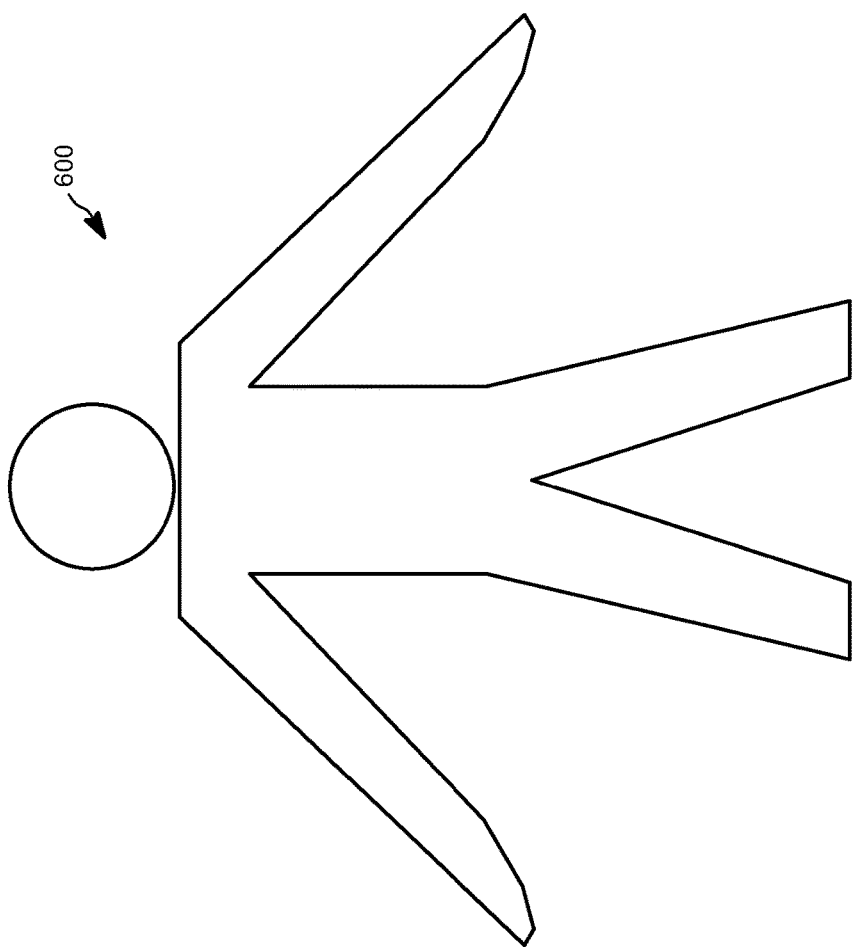
FIG. 6 illustrates an example gesture that can be detected via a wearable device having a multi-sensor detector to sense operator gestures.

FIG. 6 illustrates an example gesture 600 that can be detected via a wearable device having a multi-sensor detector to sense operator gestures. The example gesture 600 is a down gesture but as noted previously, a plurality of gestures can be similarly interpreted as described herein (e.g., See example manuals for gestures described with respect to FIG. 1). The following provides example pseudo-code for interpreting the down gesture 600. It is noted that this is but one example, and many other coding possibilities are possible to interpret this gesture and other respective gestures.

```
// Down
// Arms out, dropped down to sides.
// palm high pos z acc -> palm high neg x acc. High pos y gyro
if( C2_Global_Active && C2_Down && (System.nanoTime( ) -
C2_Down_Time > 500000000) ){
```

```
// Active Timer expires after 500ms
    C2_Global_Active = false;
    C2_Down = false;
    C2_Down_Time = 0;
    C2_Down_Start_Time = 0;
    C2_Down_Motion_Time = 0;
    C2_Down_Counter = 0;
} else if ( C2_Global_Active || ( C2_Down && (System.nanoTime( ) -
C2_Down_Time < 500000000) ) ){
    C2_Down_Start_Time = 0;
    C2_Down_Motion_Time = 0;
    C2_Down_Counter = 0;
} else {
    // Check for command actions (acc is accelerometer)
        if( left_palm_mpu9250_zacc > 12000 // Palms Down
            && right_palm_mpu9250_zacc > 12000
            && Math.abs(left_palm_mpu9250_ygyro) < 4000 //
No motion down/up
            && Math.abs(right_palm_mpu9250_ygyro) < 4000
        ){
            // Initial Conditions Met
            C2_Down_Start_Time = System.nanoTime( );
            C2_Down_Counter = C2_Down_Counter | 1;
        }
        if( left_palm_mpu9250_ygyro > 12000 // Palms moving
Down (pos y gyro)
            && right_palm_mpu9250_ygyro > 12000
            && (System.nanoTime( ) - C2_Down_Start_Time <
250000000)
        ){
            // Proper Motion Conditions Met
            C2_Down_Motion_Time = System.nanoTime( );
            C2_Down_Counter = C2_Down_Counter | 2;
        }
    if( left_palm_mpu9250_xacc < -12000 // Fingers Down
        && right_palm_mpu9250_xacc < -12000
        && left_forearm_mpu9250_xacc < -12000 // Forearms Vertical
        && right_forearm_mpu9250_xacc < -12000
        && (System.nanoTime( ) - C2_Down_Start_Time <
1000000000)
        && (System.nanoTime( ) - C2_Down_Motion_Time <
500000000)
    ){
        // Declared as Proper C2 Command
        C2_Global_Active = true;
        C2_Down = true;
        C2_Down_Time = System.nanoTime( );
        System.out.println("DOWN");
        C2_Down_Counter = C2_Down_Counter | 4;
    }
    if( ( (C2_Down_Start_Time > 0) && (System.nanoTime( ) -
C2_Down_Start_Time > 1000000000) ) ||
    ( (C2_Down_Motion_Time > 0) && ( (System.nanoTime( ) -
C2_Down_Motion_Time) > 1000000000) )
    ){
        // Start or Motion Timed Out
        C2_Down_Start_Time = 0;
        C2_Down_Motion_Time = 0;
        C2_Down_Counter = 0;
    }
}
jCheckBox_C2_Down.setSelected(C2_Down);
```

Figure 7:
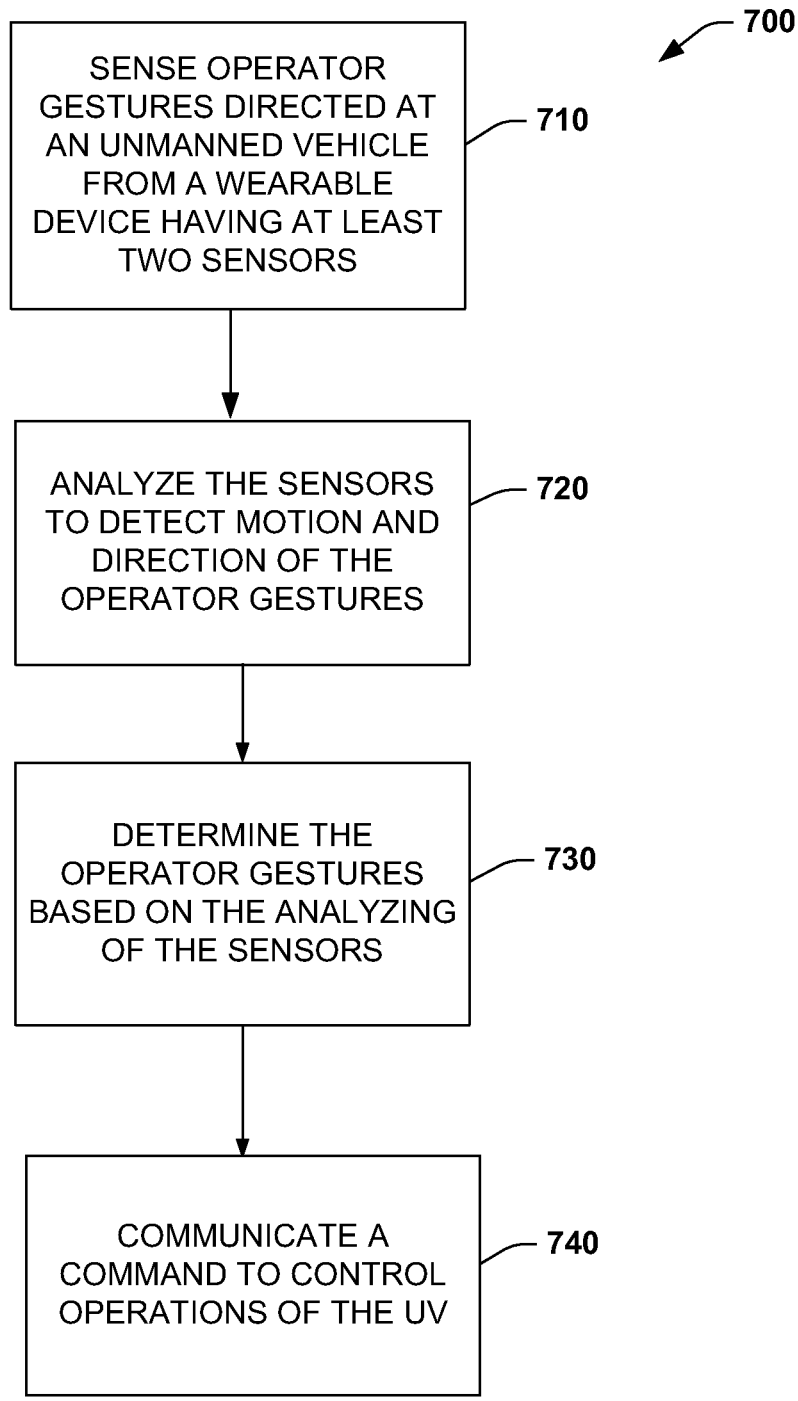
FIG. 7 illustrates an example of a method for remote signaling and control of an unmanned vehicle via a wearable device having a multi-sensor detector to sense operator gestures.

In view of the foregoing structural and functional features described above, an example method will be better appreciated with reference to FIG. 7. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various components configured in an IC or a controller, for example.

FIG. 7 illustrates an example of a method for remote signaling and control of an unmanned vehicle via a wearable device having a multi-sensor detector to sense operator gestures. At 710, the method 700 includes sensing operator gestures directed at an unmanned vehicle from a wearable device having at least two sensors (e.g., via multi-sensor detector 130 of FIG. 1). At 720, the method 700 includes analyzing the sensors to detect motion and direction of the operator gestures (e.g., via controller 150 of FIG. 1). This includes detecting motion and direction with respect to operator hand movement, operator hand movement with respect to the earth, rotational movement of the operator hand, and finger movement on the operator hand, for example. At 730, the method 700 includes determining the operator gestures based on the analyzing of the sensors (e.g., via controller 150 of FIG. 1). At 740, the method 700 includes communicating a command to control operations of the UV (e.g., via communications module 160 of FIG. 1). Although not shown, the method 700 can also include communicating the command to a mission planner application, where the mission planner application generates a control command to control the UV based on the command.

What has been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. An apparatus, comprising:
a set of wearable devices each having a multi-sensor detector to sense an operator gesture directed at an unmanned vehicle (UV), wherein each multi-sensor detector comprises:
a plurality of sensors including one of a sensor mounted on a respective wearable device proximal to an operator's finger to detect finger movement; and
another sensor to detect one of motion and direction of the operator gesture with respect to one or more operator hand movement, operator hand movement with respect to a planet's magnetic field, and rotational movement of an operator hand; and
a set of controllers to monitor respective multi-sensor detectors to determine a corresponding operator gesture based on input data provided by the plurality of sensors of a respective wearable device, wherein each controller generates a respective command for the UV based on the corresponding operator gesture;
a communications module configured to provide the respective command to the UV to control a flight path of the UV; and
a wearable display device to be worn on or about a head of an operator, the wearable display device being configured to receive flight path information for the UV from the communication module for display thereon.

2. The apparatus of claim 1, wherein the other sensor is one of an accelerometer to detect the motion and the direction of the operator gesture with respect to the operator hand movement, a magnetometer to detect the operator hand movement with respect to the planet's magnetic field, and a gyroscope to detect the rotational movement of the operator hand.

3. The apparatus of claim 1, wherein the controller sends the respective command to the communications module, the communications module to relay the respective command to the UV to control the UV.

4. The apparatus of claim 3, wherein the controller sends the respective command via a Bluetooth or a universal serial bus connection (USB) to the communications module.

5. The apparatus of claim 4, further comprising a mission planner application, wherein the mission planner application is to communicate with the communications module to receive the respective command and generate a corresponding control command to control the UV based on the respective command.

6. The apparatus of claim 5, wherein the mission planner application executes on a computer and communicates via a wireless link with the communications module to receive the respective command.

7. The apparatus of claim 6, wherein:
the wearable display device is wearable glasses;
the wearable glasses are to receive mission status information provided by the mission planner application; and
the wearable glasses are to display the mission status information to the operator.

8. The apparatus of claim 6, wherein the mission planner application communicates a software packet via a scripting interface to a generic protocol interface that translates commands in the generic protocol to an application that communicates with the communications module.

9. The apparatus of claim 8, wherein the generic protocol is a transport control protocol (TCP) and the software packet is communicated via a Python script.

10. The apparatus of claim 1, wherein the other sensor is a magnetometer to detect the operator hand movement with respect to the planet's magnetic field.

11. A system, comprising:
a plurality of wearable devices each having a multi-sensor detector to sense an operator gesture directed at an unmanned vehicle (UV), wherein each multi-sensor detector comprises a plurality of sensors including:
a sensor mounted on a respective wearable device of the plurality of wearable devices proximal to an operator's finger to detect finger movement; and
another sensor that includes one of an accelerometer to detect motion and direction of the operator gesture with respect to operator hand movement, a magnetometer to detect operator hand movement with respect to a planet's magnetic field, and a gyroscope to detect rotational movement of the operator's hand; and
a plurality of controllers to monitor respective multi-sensor detectors to determine a corresponding operator gesture based on input data provided by the plurality of sensors of a respective wearable device, wherein each controller generates a respective command for the UV based on the corresponding operator gesture;
a communications module to communicate the respective command to the UV to control a flight path of the UV; and
a wearable display device to be worn on or about a head of a user, the wearable display device being configured to receive flight path information for the UV from the communications module for display thereon.

12. The system of claim 11, wherein the communications module is a mobile device.

13. The system of claim 12, wherein the controller sends the respective command via a Bluetooth or a universal serial bus connection (USB) to the communications module.

14. The system of claim 13, further comprising a mission planner application wherein the mission planner application is to communicate with the communications module to receive the respective command and generate a control command based on the respective command to control the UV.

15. The system of claim 14, wherein the mission planner application executes on a computer and communicates via a wireless link with the communications module to receive the respective command.

16. The system of claim 15, wherein:
the wearable display device is wearable glasses;
the wearable glasses are to receive mission status information provided by the mission planner application; and
the wearable glasses are to display the mission status information to the operator.

17. The system of claim 16, wherein the mission planner application communicates a software packet via a scripting interface to a generic protocol interface that translates commands in the generic protocol to an application that communicates with the communications module.

18. The system of claim 17, wherein the generic protocol is a transport control protocol (TCP) and the software packet is communicated via a Python script.

19. A method, comprising:
sensing, via respective controllers a corresponding operator gesture directed at an unmanned vehicle (UV) from an wearable device having multi-sensor detectors, wherein each multi-sensor detector comprises at least two sensors, the at least two sensors including a first sensor mounted on a respective wearable device proximal to an operator's finger to detect finger movement and a second sensor to detect one of motion and direction of the operator gesture with respect to one of operator hand movement, operator hand movement with respect to a planet's magnetic field, and rotational movement of the operator's hand;
analyzing, via the respective controllers, sensor data provided by the at least two sensors of a respective wearable device to detect motion and direction of the operator gestures with respect to operator hand movement, operator hand movement with respect to the earth, rotational movement of the operator hand, and the finger movement on the operator's hand;
determining, via the respective controllers, the corresponding operator gesture based on the analyzing of the sensor data provided by the at least two sensors of the respective wearable device;
communicating, via a communications module controller, a corresponding command to the UV to control an operation of the UV based on the corresponding determined operator gesture; and
communicating, via the communications module, flight path information for the UV to a wearable display device to be worn on or about a head of an operator for display thereon.

20. The method of claim 19, wherein the communicating comprises communicating the corresponding command to a mission planner application, wherein the mission planner application generates a control command to control the operation of the UV based on the corresponding command.

* * * * *